(12) United States Patent
Ikeyama et al.

(10) Patent No.: US 7,736,495 B2
(45) Date of Patent: *Jun. 15, 2010

(54) FILTRATION DEVICES WITH EMBEDDED RADIO FREQUENCY IDENTIFICATION (RFID) TAGS

(75) Inventors: Norio Ikeyama, Osaka (JP); Mark Wilf, San Diego, CA (US)

(73) Assignees: Hydranautics, Oceanside, CA (US); Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/251,358

(22) Filed: Oct. 14, 2008

(65) Prior Publication Data

US 2009/0032477 A1     Feb. 5, 2009

Related U.S. Application Data

(63) Continuation of application No. 10/795,138, filed on Mar. 5, 2004, now Pat. No. 7,481,917.

(51) Int. Cl.
    *B01D 61/00*     (2006.01)
(52) U.S. Cl. .................. 210/85; 210/321.87; 210/321.6; 210/323.2; 210/806; 340/539.1
(58) Field of Classification Search .................. 210/806, 210/85, 321.87, 497.1, 321.6, 323.2; 340/539.1; 700/115, 214, 215
    See application file for complete search history.

(56) References Cited

U.S. PATENT DOCUMENTS

| | | |
|---|---|---|
| 3,417,870 A | 12/1968 | Bray |
| 3,554,378 A | 1/1971 | Kohl |
| 4,235,723 A | 11/1980 | Bartlett, Jr. |
| 4,409,849 A | 10/1983 | Roos |
| 4,496,461 A | 1/1985 | Leeke et al. |
| 4,708,791 A | 11/1987 | Dillard, III |
| 4,855,058 A | 8/1989 | Holland et al. |
| 5,108,604 A | 4/1992 | Robbins |
| 5,300,875 A | 4/1994 | Tuttle |
| 5,461,385 A | 10/1995 | Armstrong |
| 5,528,222 A | 6/1996 | Moskowitz et al. |
| 5,674,381 A | 10/1997 | Dekker |

(Continued)

FOREIGN PATENT DOCUMENTS

DE     3740249 C     11/1988

(Continued)

OTHER PUBLICATIONS

Interantional Search Report, Sep. 8, 2006.

(Continued)

*Primary Examiner*—Terry K Cecil
(74) *Attorney, Agent, or Firm*—Knobbe, Martens, Olson & Bear, LLP

(57) ABSTRACT

Embodiments of the present invention comprise reverse osmosis filters and systems comprising embedded radio frequency identification (RFID) tags for storing and retrieving data. The RFID tags can be preferably embedded under a filtration device's protective outer shell. Information can be easily stored onto and retrieved from the embedded RFID tags. The ability to easily store and retrieve data from the embedded RFID devices facilitates the creation of loading maps, monitoring, addition, and replacement of fluid filtration devices.

29 Claims, 6 Drawing Sheets

U.S. PATENT DOCUMENTS

| | | | |
|---|---|---|---|
| 6,040,773 | A | 3/2000 | Vega et al. |
| 6,090,187 | A | 7/2000 | Kumagai |
| 6,224,767 | B1 | 5/2001 | Fujiwara et al. |
| 6,549,176 | B2 | 4/2003 | Hausladen |
| 6,558,444 | B1 | 5/2003 | Hunter |
| 6,607,501 | B2 | 8/2003 | Gorsuch |
| 6,609,070 | B1 | 8/2003 | Lueck |
| 6,617,963 | B1 | 9/2003 | Watters et al. |
| 6,971,274 | B2 | 12/2005 | Olin |
| 7,481,917 | B2 * | 1/2009 | Ikeyama et al. ............... 210/85 |
| 2002/0189667 | A1 | 12/2002 | O'Dougherty et al. |
| 2003/0017804 | A1 | 1/2003 | Heinrich et al. |
| 2003/0128812 | A1 | 7/2003 | Appleby et al. |
| 2004/0112529 | A1 | 6/2004 | Karlsson et al. |
| 2005/0060974 | A1 | 3/2005 | Palmerton et al. |
| 2005/0194317 | A1 | 9/2005 | Ikeyama et al. |
| 2007/0240492 | A1 | 10/2007 | DiLeo et al. |

FOREIGN PATENT DOCUMENTS

| | | | |
|---|---|---|---|
| DE | 196 27 595 | A | 1/1997 |
| DE | 19627595 | A1 | 1/1997 |
| DE | 201 04 481 | U1 | 3/2001 |
| DE | 20104481 | U1 | 7/2001 |
| DE | 101 60 429 | A1 | 6/2003 |
| DE | 10160429 | A1 | 6/2003 |
| DE | 10254599 | A1 | 6/2003 |
| EP | 0700 313 | B1 | 11/1996 |
| JP | 05-345181 | | 12/1993 |
| JP | 2002-150241 | | 5/2002 |
| WO | WO 98/35327 | A1 | 8/1998 |
| WO | WO 98/41306 | | 9/1998 |
| WO | WO 00/32298 | | 6/2000 |
| WO | WO 00/40322 | | 7/2000 |
| WO | WO 00/45324 | A3 | 8/2000 |
| WO | WO 00/50849 | A1 | 8/2000 |
| WO | WO 00/67221 | | 11/2000 |
| WO | WO 02/15139 | A1 | 2/2002 |

OTHER PUBLICATIONS

Written Opinion of the International Searching Authority, Sep. 8, 2006.

International Search Report for Application No. PCT/US07/06152, Mar. 12, 2008.

Supplementary Search Report for Application No. EP 05 72 4483 dated Mar. 20, 2007.

English Translation of DE10254599, published Jun. 2003.

"RFID System Site Survey" Presentation to Hydranautics, a Nitto Denko company, by GBN on Nov. 10, 2003.

"HYDRAcap® Superior Ultrafiltration Membrane Technology" brochure by Hydranautics, A Nitto Denko corporation (2001).

* cited by examiner

FILTRATION DEVICES WITH EMBEDDED RADIO FREQUENCY IDENTIFICATION (RFID) TAGS

RELATED APPLICATIONS

This application is a continuation of U.S. patent application Ser. No. 10/795,138, filed Mar. 5, 2004, now U.S. Pat. No. 7,481,917 which is incorporated in its entirety by reference herein.

BACKGROUND OF THE INVENTION

1. Field of the Invention

The present invention relates to reverse osmosis filtration devices and filtration systems, and more particularly, to filtration devices that have embedded RFID tags.

2. Description of the Related Art

Spiral membrane elements for ultrafiltration, microfiltration and reverse osmosis have long been regarded as efficient devices for separating components of fluid mixtures. In a typical process, a pressurized fluid mixture is brought into contact with a membrane surface whereby one or more components of that fluid mixture pass through the membrane because of a difference in chemical potential and, due to varying mass transport rates through the membrane, a separation is achieved.

Reverse osmosis filtration systems typically utilize a plurality of filtration devices connected in series. Such systems are often planned out in a computer-generated loading map, which takes into account a plurality of varying characteristics among the filter devices. As the process of manufacturing filtration devices can lead to variability in the devices' characteristics, such variability is typically an important factor when planning a filtration system that contains a plurality of filtration devices. An optimal configuration of devices particularly takes into account the devices' various output over time versus rejection profiles. Moreover, the performance characteristics of filtration devices may change over time, and specific devices may need to be removed or replaced.

The creation of a load map, monitoring, and replacing of filtration devices would benefit greatly if the filtration's information could be quickly and easily stored and later retrieved. However, attempts to provide filter devices with critical information which can be easily retrieved has been very difficult. During filtration, the filter devices are exposed to very high water pressures, which can easily strip away devices' paper-based tags, such as barcodes. Moreover, bar codes and other data storage mechanisms, which rely on optics to read, are not easily accessible and readable when they are placed in pressure vessels of filtration systems.

SUMMARY OF THE INVENTION

Embodiments of the present invention comprise reverse osmosis filters and systems comprising embedded radio frequency identification (RFID) tags for storing and retrieving data. The RFID tags can be preferably embedded under a filtration device's protective outer shell, or contained within a liquid and/or gas-impermeable container attached to the filtration devices. Information can be easily stored onto and retrieved from the embedded RFID tags. Since the RFID tags may be embedded under the filtration devices' protective outer shells, they are not exposed to fluids or high pressure that would normally damage data storage devices. The ability to easily store and retrieve data from the embedded RFID devices facilitates the creation of loading maps, monitoring, addition, and replacement of fluid filtration devices.

Preferred embodiments of the spiral wound membrane filtration devices of the present invention comprise a central porous core tube; at least one pair of membrane sheets attached at one end to, and wound to spiral outwardly about the central porous core tube; a protective outer shell; and a radio-frequency identification (RFID) tag embedded under or within said protective outer shell. Particularly preferred embodiments further comprise permeate spacer sheets secured between a pair of membrane sheets; feed spacer sheets attached to a membrane sheet to define at least one permeate channel; and anti-telescoping devices. In particularly preferred embodiments, the protective outer shell comprises fiber reinforced plastic. The plastic of the outer shell preferably comprises epoxy, and the fiber of the outer shell preferably comprises glass fiber such as twine.

The filtration devices and systems of the present invention preferably comprise a plurality of RFID tags, which are capable of storing and emitting data. In accordance with preferred embodiments, the embedded RFID tags are not directly exposed to fluids and/or high pressure.

Methods of making a reverse osmosis filtration device preferably comprise: attaching the pair of membrane sheets to the core tube, wherein the membrane sheets are wound to spiral outwardly about the central porous core tube; covering the membrane sheets with an outer wrap; attaching an RFID tag to the outer wrap; and covering the outer wrap and RFID tag with the protective outer shell.

Methods of loading a plurality of RFID-bearing filtration devices having different performance characteristics comprise inputting data indicative of the performance characteristics of each filtration device into the device's RFID tag; and grouping membrane filtration devices together to achieve groups characterized by at least a minimal performance standard. In preferred embodiments, software can be used to create and alter loading maps.

Methods of monitoring a plurality of RFID-bearing filtration devices having different performance characteristics over time comprise: inputting data indicative of the performance characteristics of each filtration device into the device's RFID tag; inputting data into the device's RFID tag at a later time; and periodically reviewing said data.

Methods of removing or replacing a plurality of RFID-bearing filtration devices having different performance characteristics over time, comprise: inputting data indicative of the performance characteristics of each filtration device into the devices' RFID tag; and removing or replacing said RFID-tagged filtration devices if and when the data on its RFID tag meets a defined characterization.

In preferred embodiments of the present invention, the data inputted into RFID tags preferably comprises, but is not limited to, the filters': output over time versus rejection data; location; performance history; manufacturing history; loading map data, and inspection data. In preferred embodiments, data may be periodically added, retrieved, and/or removed from RFID tags. In further embodiments, the inputted data may be used to monitor the performance of filtration devices and/or used to determine when to replace said RFID-tagged filtration devices.

DETAILED DESCRIPTION OF THE PREFERRED EMBODIMENT

Embodiments of the present invention comprise reverse osmosis desalination systems comprising spiral wound membrane filter devices, comprising RFID tags. Embodiments of the reverse osmosis devices and systems of the present invention comprise RFID tags attached to and/or embedded within reverse osmosis filtration devices and systems. Information can preferably be stored onto and retrieved from the embedded RFID tags. In embodiments of the present invention, the ability to easily store and retrieve data from the embedded RFID devices facilitates the creation of loading maps, monitoring, addition, and replacement of fluid filtration devices. Moreover, the use of RFID tags is advantageous over the use of other data storing mechanisms, such as bar codes, because it takes less time to read an RFID tag than it takes to read a bar code. In addition, no line of sight is necessary to read an RFID tag. Additionally, the process of reading an RFID is orientation-independent. Moreover, several RFID tags may be read simultaneously.

Spiral wound membrane reverse osmosis devices, and the construction and operation thereof, are known to those of skill in the art. Such devices are disclosed in, for example, U.S. Pat. Nos. 3,417,870; 3,554,378; 4,235,723; and 4,855,058.

Figure 1:
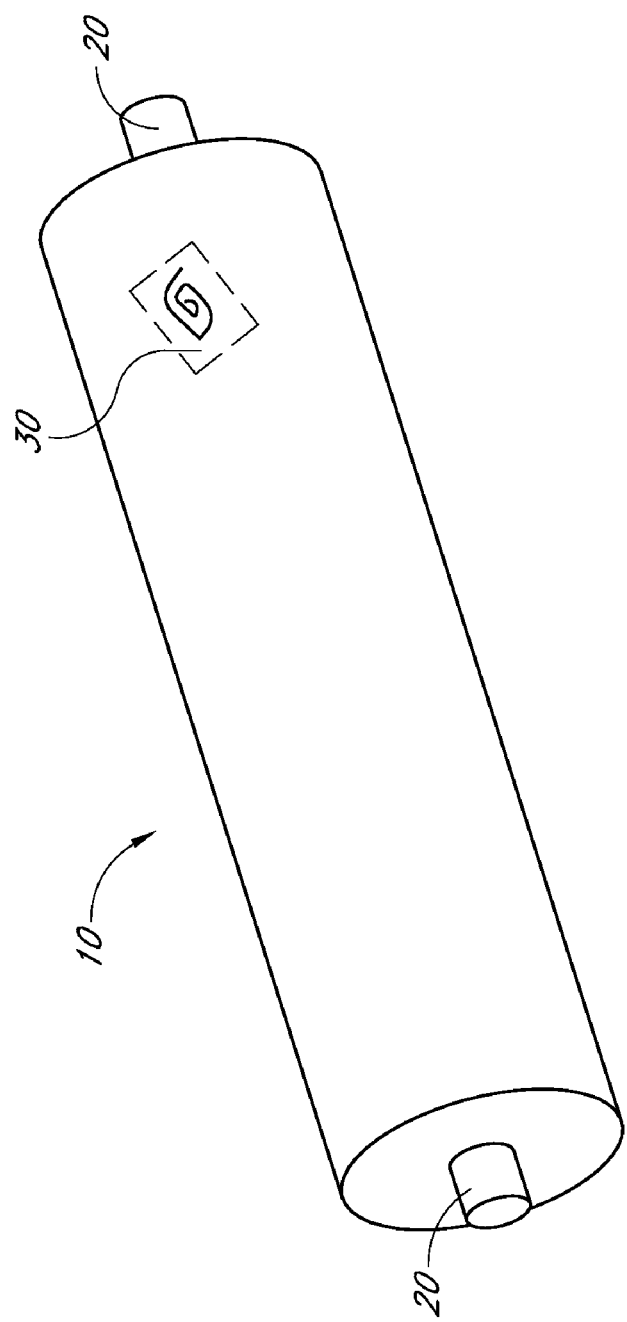
FIG. 1 shows a reverse osmosis filtration device with an embedded RFID tag.
Figure 2:
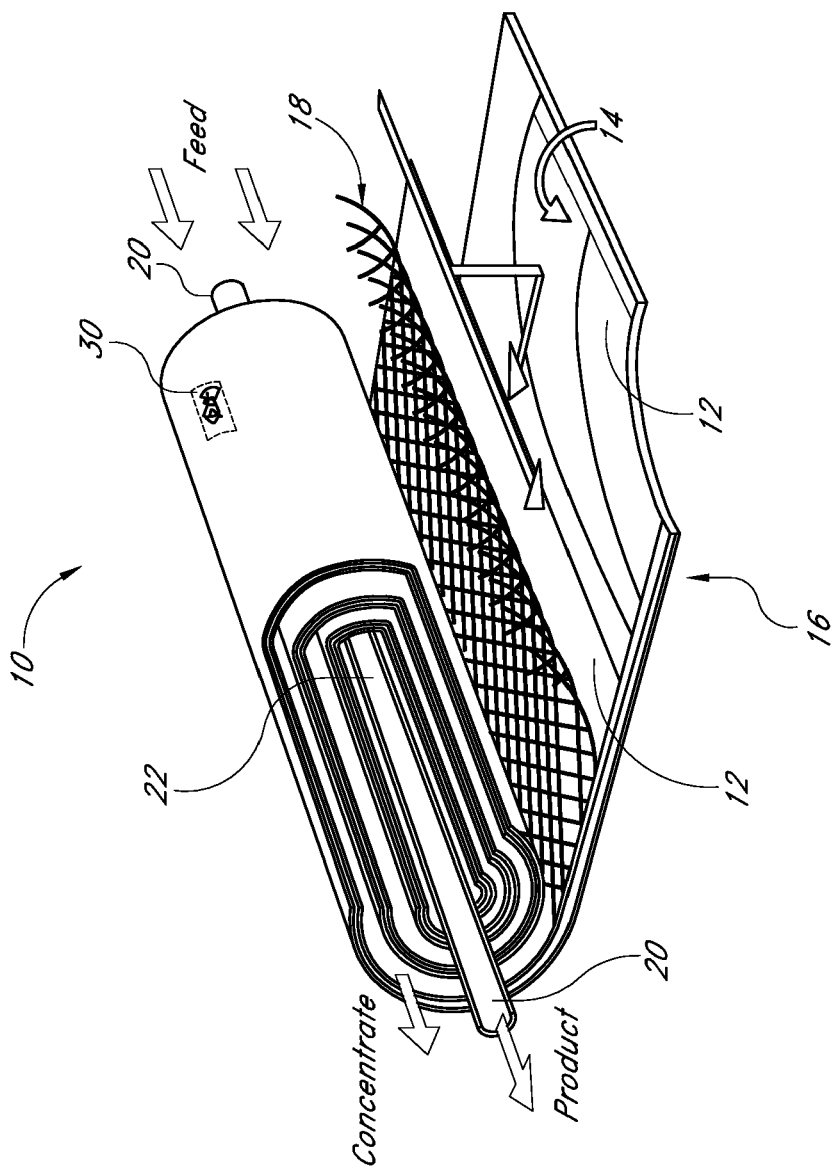
FIG. 2 represents a cut-away view of a reverse osmosis filtration device with an embedded RFID tag.
Figure 3:
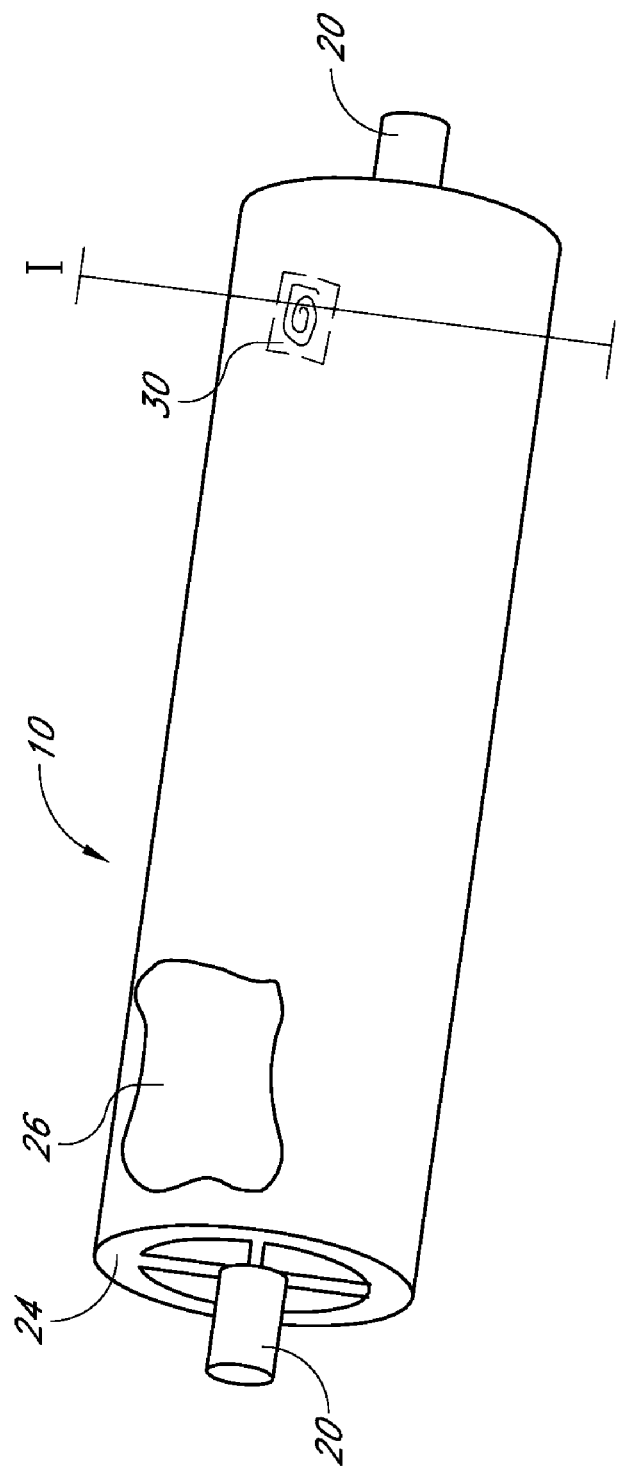
FIG. 3 shows another view of a reverse osmosis filtration device with an embedded RFID tag, including a cut away view showing the outer wrap of the filtration device.

FIG. 1 generally depicts a reverse osmosis filtration device 10 with an embedded RFID tag 30. As illustrated in FIG. 2, in a spiral wound reverse osmosis filter device 10, two flat sheets of membrane 12 are separated with a permeate spacer sheet 14 to form a membrane assembly 16. This membrane assembly 16 is sealed on three sides with the fourth side left open for permeate to exit. A feed spacer sheet 18 is added to the one of the membrane sheets 12 of the membrane assembly, which preferably forms at least one permeate channel. A plurality of these membrane assemblies 16 are wound around a central porous permeate tube 20. This porous tube 20 comprises perforations 22 to collect permeate from the multiple membrane assemblies 16. As illustrated in FIG. 3, preferred embodiments may also contain anti-telescoping devices 24 which prevent movement of the membrane assemblies 16 and/or feed spacer 18 sheets along the central axis of the filter device 10. Preferred embodiments of the filtration devices preferably comprise a plurality of membrane sheets, feed spacer sheets, and permeate spacer sheets. Preferred embodiments of filtration device 10 are approximately 100 or 150 cm long and 10 or 20 cm in diameter.

Figure 4:
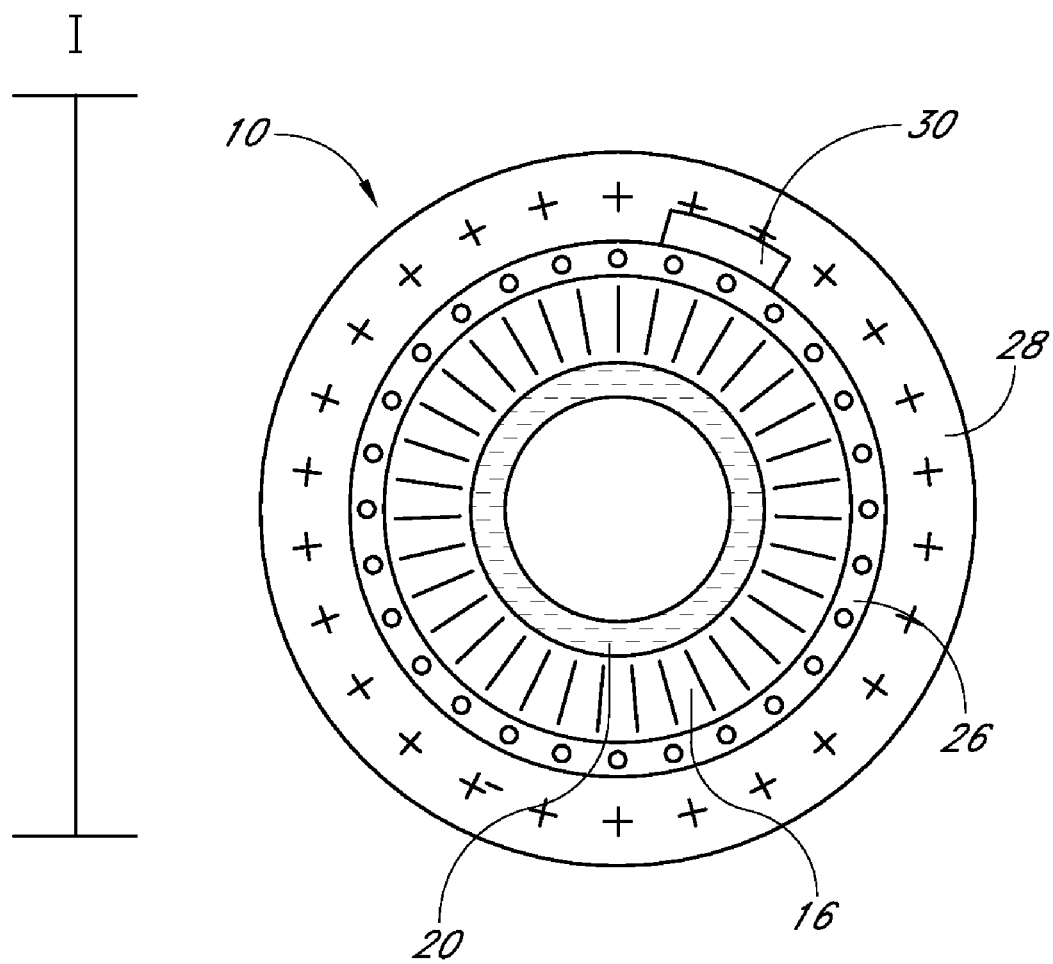
FIG. 4 is a cross-sectional view along line I of FIG. 4.

A fraction of the feed water, as it flows across the filter device 10, permeates through the membranes 12 along a spiral path, toward the central porous permeate tube 20. As illustrated in FIG. 4, an outer wrap 26 is preferably wrapped around the outermost membrane assembly 16. The outer wrap 26 preferably comprises a plastic or fabric sheet which can be glued to the outermost membrane assembly 16. In preferred embodiments, a protective outer shell 28 is attached to the outer wrap 26. The outer shell 28 preferably comprises fiber-reinforced plastic.

As illustrated in FIG. 4, embodiments of the present invention preferably contain at least one RFID tag 30 located beneath the protective outer shell 28 of filtration devices 10.

In particularly preferred embodiments, the RFID tag 30 is attached to an outer wrap 26 by glue or other adhesive known to those skilled in the art, and covered by an outer shell 28 preferably comprising fiber reinforced plastic. Advantageously, in using this configuration the tags 30 are not exposed to fluids or high pressure that would normally damage data storage devices. In preferred embodiments of the present invention, the plastic which is used to cover the RFID comprises epoxy. Preferred embodiments of the present invention can use other plastics known to those skilled in the art. In preferred embodiments, the fiber of the protective outer shell comprises glass fiber. In another preferred embodiment, the fiber of the protective outer shell comprises plastic fiber. Preferred embodiments of the fiber of the protective outer shell comprise glass or plastic fiber in the form of rope, twine, or other similar form known to those skilled in the art. Adhesive tape can also be used as a protective outer shell.

In alternate preferred embodiments, the RFID tag is contained within a protective, liquid-impermeable container. The container may be attached to, or placed in close proximity to, filtration devices and systems. The container preferably comprises glass, plastic, or other liquid-impermeable substance known to those skilled in the art.

Preferred embodiments of the filter device 10 can be manufactured in a variety of ways. In one preferred method of fabricating preferred embodiments of the filter devices, a permeate spacer sheet 14 is preferably placed in between a pair of membrane sheets 12. Glue or other adhesive known to those skilled in the art is applied, along the perimeter, of the sides of the membrane sheets 12 which contact the permeate spacer sheet 14 located between the membrane sheets 12. This gluing preferably causes the permeate spacer sheet 14 to remain attached to the membrane sheets 12, thus forming a membrane assembly 16. A feed spacer sheet 18 is placed onto the membrane assembly 16. Then a membrane assembly is placed onto the feed spacer sheet 18, followed by another feed spacer sheet 18, and so on. This process is repeated with a plurality of membrane assemblies 16 and feed spacer sheets 18, which are wound around the central porous permeate tube. In alternate preferred embodiments, the membrane sheets 12, adhesive, permeate spacer sheets 14, and feed spacer sheets 18 can be added during the winding process. A layer of adhesive is then preferably applied to the outermost membrane sheet 12, permeate spacer sheet 14, or feed spacer sheet 18 to attach an outer wrap 26. The outer wrap preferably comprises plastic, fabric, or other suitable material known to those skilled in the art. Then, glue or other adhesive known to those skilled in the art is applied to an RFID tag 30, which is preferably attached to the outer wrap 26. Then, a protective outer shell 28 is preferably wrapped around the outer wrap 26 and RFID tag 30. The protective outer shell 28 preferably covers the whole surface of the outer wrap 26 and the RFID tag 30. The protective outer shell 28 preferably forms a seal to prevent the RFID tag 30 from being exposed to liquids, humidity, or high pressure caused by the filtering process. In preferred embodiments, the protective outer shell 28 is created by applying a plastic-based adhesive to the outer wrap 26. For example, one plastic-based adhesive that can be used is epoxy. In alternative embodiments, fibers are attached to the plastic protective outer shell 28. In particularly preferred embodiments, the fiber comprises twine, which is wrapped around the epoxy. In other preferred embodiments, anti-telescoping devices 24 can be attached to the sides of the filter device, as illustrated in FIG. 2. The anti-telescoping devices 24 preferably comprise plastic, and are preferably attached to the filter by glue or other adhesives known to those skilled in the art.

The construction and operation of RFID tags is well known to those of skill in the art. RFID tags are disclosed in, for example, U.S. Pat. Nos. 5,461,385; 5,528,222; and 6,040,773. In preferred embodiments of the present invention, a radio frequency identification tag system utilizes a radio frequency identification tag that includes stored tag information. The tag preferably includes an antenna element and a common electrode. The antenna element electrostatically receives an exciter signal from a proximately-located electrostatic exciter. In preferred embodiments, the electrostatic exciter may be advantageously constructed from available tag exciter circuitry, such as for example, Motorola Indala's ASR-120 base station (part no. 05200-006 available from Motorola Indala Corporation, 3041 Orchard Parkway, San Jose, Calif. 95134). The ASR-120 device can be preferably adapted by forming and coupling a suitable exciter electrode, for example a copper plate electrode, to one of the dipole electrode connections thereby forming the exciter antenna element. The other dipole electrode connection is preferably coupled to earth thereby forming an exciter common electrode. As the ASR-120 is also adaptable to receive from a radio frequency identification tag the read signal, one will appreciate that it may be further adapted to include the reader antenna element coupled to the read electrode connection.

Upon receiving the exciter signal, the tag becomes energized, thereby causing it to generate a read signal based on the stored tag information. The antenna element then electrostatically sends the read signal to a proximately-located reader, which detects the stored tag information. In addition, exactly one of the tag common electrode and the tag antenna element is arranged to magnetically store tag state information. The tag state information represents exactly one state of two possible states and is preferably read by a proximately-located magnetic reader.

The RFID tag can be powered in a variety of ways. In another preferred embodiment of the present invention, the RFID tag possesses a rechargeable battery, which can be used to provide power to the RFID tag and/or the measuring devices. RFID tags having a combined battery and passive power source can be produced by those of skill in the art. Such an RFID tag is disclosed in US patent application 2003/0017804.

One preferred embodiment of the present invention provides an RFID tag that is powered both by an internal battery and passively by an interrogating RF field. As a result, the RFID tag can be passively powered after the internal battery has been depleted. In addition, the rechargeable battery can preferably provide power to data collection and transfer devices, such as flow and conductivity meters.

More particularly, an embodiment of the RFID tag includes electronic circuitry to provide RFID functionality, and an energy storage device coupled to the electronic circuitry to provide an operational voltage thereto. A battery is operatively coupled to the energy storage device to charge the energy storage device. A rectified RF power source derived from an interrogating RF field is also operatively coupled to the energy storage device to charge the energy storage device. The rectified RF power source and the battery are electrically separated from each other. The energy storage device remains charged by the battery in the absence of the RF interrogating field while the battery has remaining capacity. After the battery has become depleted, the energy storage device is charged by the presence of the RF interrogating field.

Figure 5:
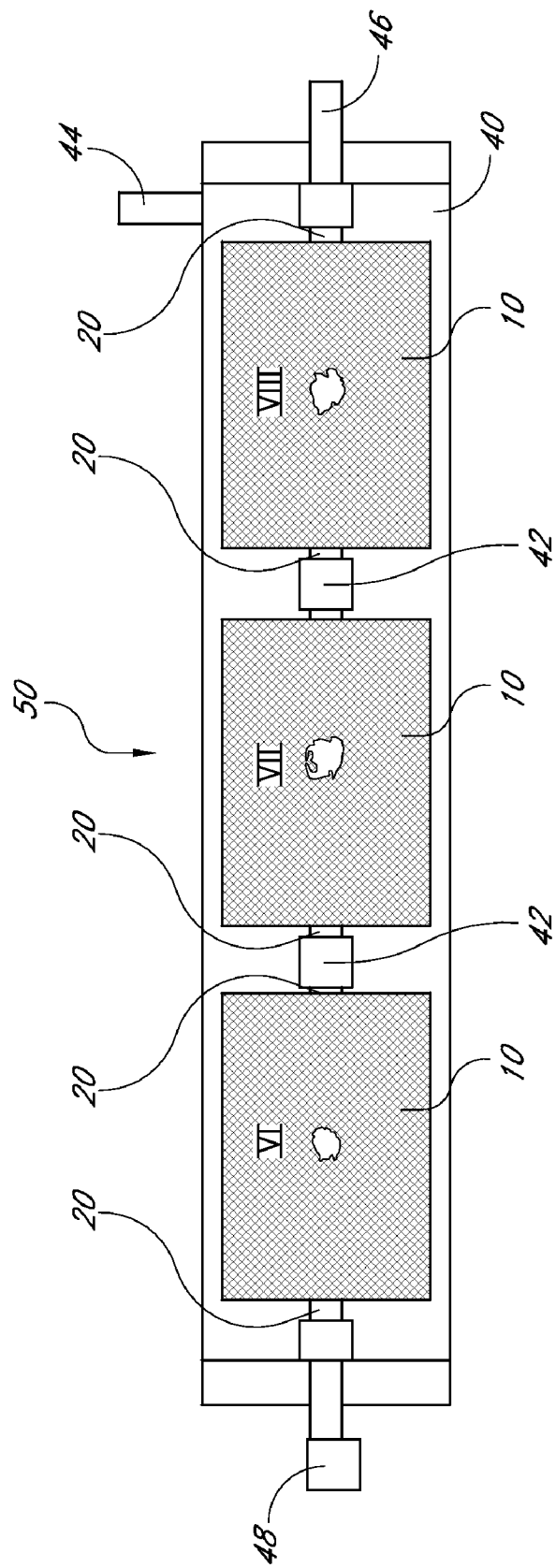
FIG. 5 shows a reverse osmosis filtration system.

As illustrated in FIG. 5, reverse osmosis filtration systems 50 may be preferably staged with a plurality of membrane filter devices 10 connected in series within a pressure tube 40. Filtration devices of FIGS. 1-4 may preferably be used in reverse osmosis filtration systems 50 of FIG. 5. Particularly preferred embodiments of filtration systems 50 comprise three to ten filtration devices in series. The filter devices 10 are connected by connectors 42 which connect permeate tubes 20 of the filter devices 10. The concentrate fluid, such as brine, enters the system 50 through an entry tube 48. The entry tube 48 can preferably be attached to an outside source of fluid, including the exit tube 44 of another filter system. The brine stream from the first filter device (VI) becomes the feed to the second filter device (VII), and so on for each filter device 10 within the pressure tube 40. The brine stream from the last filter (VIII) device exits the pressure tube 40, as a concentrate, from the exit tube 44. The permeate from each filter device 10 is combined together, as a composite solution, in the central tube 20 of subsequent filter devices 10, connected in series, along the pressure vessel 40. A permeate in each subsequent filter device 10, located in the direction of the permeate flow, is the composite permeate of the given filter device 10 combined with permeate from filter devices 10 located up stream of it. The ion composition of the permeate is a composite concentration, formed in the same manner. For example, permeate produced in the first filter device (VI) flows into the permeate tube 20 of the second filter device (VII) and combines with permeate produced in the second filter device (VII). This combined permeate flows into permeate tube 20 of the third filter device (VIII) and forms composite permeate with permeate produced in the third filter device (VIII). This process continues until the combined permeate from all of the filter devices 10 leaves the pressure vessel through the permeate port 46 as a single stream. In a commercial reverse osmosis unit, a plurality of pressure vessels preferably operate in parallel, having feed, concentrate and permeate ports connected together to corresponding manifolds.

The performance of reverse osmosis systems is typically monitored by collecting information on flows, pressures and conductivities of feed, permeate and concentrate of a membrane stage or an RO train. The measurements of permeate flow are related to the combined permeate produced by all of the filter devices in the reverse osmosis unit. Furthermore, permeate conductivity can be measured from each individual pressure vessel. RFID can preferably be attached to individual filtration devices 10 of filtration systems 50. Moreover, RFID tags may be attached to other components of the RFID system. For example, RFID tags can preferably be attached to connectors 42, permeate exit ports 46, concentrate exit ports 44, entry ports 48, or permeate tubes. In preferred embodiments, RFID tags of filtration systems 50 are not directly exposed to high pressure and/or liquids and/or humidity. RFID tags of filtration systems 50 may be embedded under the filtration devices protective outer shell, as in FIGS. 1-4. In other preferred embodiments, RFID tags may be enclosed within a fluid and/or gas-impermeable container attached to various components of the reverse osmosis filtration system.

Preferred embodiments of the present invention comprise methods of creating loading maps, which are used to create filtration systems comprising a plurality of reverse osmosis filtration devices. In creating a filtration system, it is typically necessary to achieve a desired performance of the system by taking into consideration variations in performance among individual filter devices. The characteristics of individual filtration devices can be easily stored on and retrieved from embedded RFID tags, which facilitates the creation, monitoring, and maintenance of reverse osmosis filtration systems.

Figure 6:
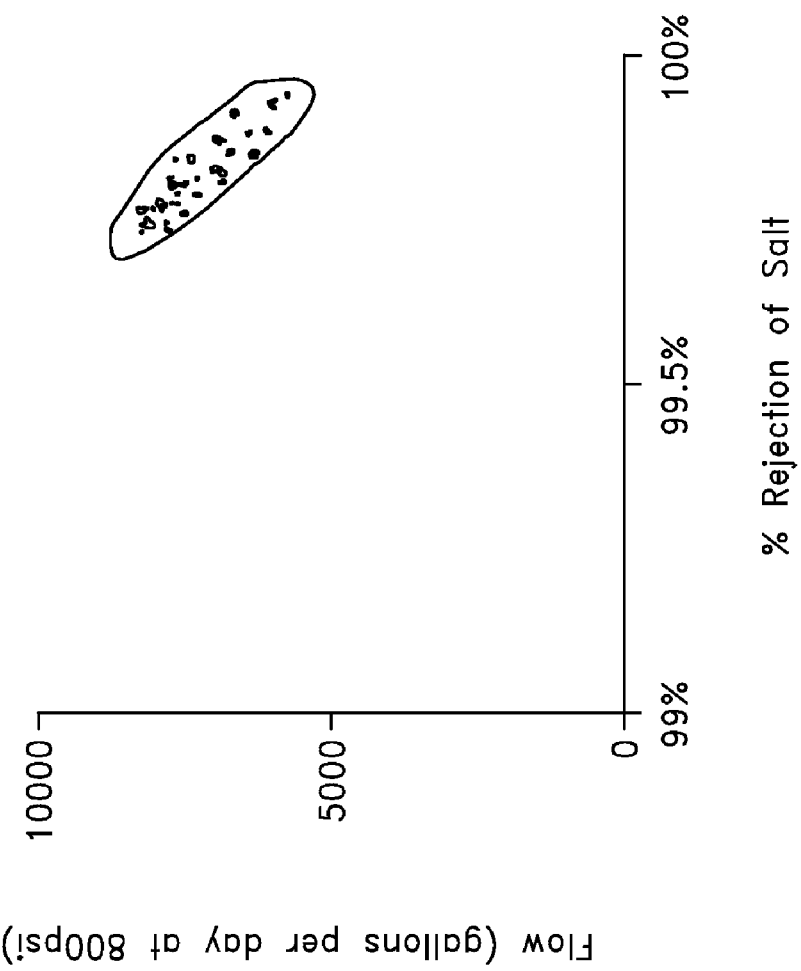
FIG. 6 is a graph of flow versus rejection data for numerous reverse osmosis filtration devices.

Variations in performance among filtration devices usually occur as a result of imperfections or simply routine variations caused during the process of manufacturing filtration devices. As illustrated in FIG. 6, variations in performance can usually be observed and analyzed as the filters' output over time versus rejection data. The filters' output over time versus rejection data can be used to determine where to place the filters in relation to each other.

Methods of creating loading maps preferably comprise grouping membrane filtration devices together to achieve groups characterized by at least a minimal performance standard. In preferred embodiments of filtration systems, individual devices which cannot eliminate at least 95% of salt from feed fluid will not be used in the filtration system. In other preferred embodiments of the present invention, individual devices which cannot eliminate at least 99% of salt from feed fluid will not be used in the filtration system. In particularly preferred embodiments of the present invention, individual devices which cannot eliminate at least 99.6% of salt from feed fluid will not be used in the filtration system. In other preferred embodiments of the present invention, individual devices which cannot filter at least 5000 gallons of feed per day at 800 psi will not be used in the filtration system. In further preferred embodiments of the present invention, individual devices which cannot filter at least 6000 gallons of feed per day at 800 psi will not be used in the filtration system. In particularly preferred embodiments, the placement of filter devices will take into account a combination of individual filters' output over time and rejection characteristics. A goal is to have both output over time and rejection characteristics fall within a reasonable range. For example, without intending to be limited to this particular example, a filter device will only be used if it can both eliminate at least 95% of salt from feed fluid, and has permeate permeability of 0.05 to 0.5 gallons per square feet per day, psi.

Preferred embodiments of the method of creating a loading map for a reverse osmosis filtration system comprise software which constructs the loading map based upon the individual filters' performance characteristics. The software may preferably store data for each of the filters, including but not limited to the filters' performance characteristics, the RFID tag data for the filters, and other data such as the filters' location, manufacturing history, performance data, output over time versus rejection data, inspection data, and loading map data.

In preferred embodiments of the present invention, the inputted data of the RFID devices include, but are not limited to the filter's: location, manufacturing history, performance data, output over time versus rejection data, inspection data, and loading map data. Preferred embodiments of the filtration devices and filtration systems of the present invention comprise a plurality of RFID tags.

In preferred embodiments, data can be periodically added to or removed from the RFID tags. The RFID tags can be periodically scanned to monitor the system. The data may be used to determine when to replace and/or remove devices from filtration devices and systems. Data from the RFID tags can be stored and used in various manners known to those skilled in the art, including but not limited to, for example, stored in a digital format and used by a computer.

For example, once a filter device is manufactured, it can be tested for its performance characteristics. Then, data can preferably be added to the RFID tag of that particular device. The data can include the output over time, rejection characteristics, when the filter was made, who made the filter, where the filter was made, who supplied the materials that were used to make the filter, and other kinds of data known to those skilled in the art. In alternative embodiments, the data can also be stored into a database on a computer, or other location or format known to those skilled in the art. Software can preferably then be used to analyze the output over time and rejection characteristics of a plurality of filter devices, and to create a loading map. The filters that are ultimately assigned a location on the loading map will preferably have performance characteristics (such as output over time and percent rejection) which fall within the desire ranges.

Based upon the characteristics of the filters and the loading map, the filters can be preferably placed into filtration systems. Their positions relative to each other can be assigned by the computer software, or by a user. In preferred embodiments, the filters' positions and locations within the system can also be stored in the computer and inputted into the filter devices' RFID tags. RFID tags can also be attached to entire systems, as described above, and the information can be entered into a computer. The filters and systems can be periodically inspected and/or monitored. In preferred embodiments, data can be periodically inputted and retrieved from the RFID tags. In some preferred embodiments, RFID tags are read one at a time by a hand-held device or other information-retrieving device known to those skilled in the art. In other preferred embodiments, information from a plurality of RFID tags can be retrieved simultaneously. In preferred embodiments, software can be used by a computer to use filters' and filter systems' data to analyze performance of the system or devices. Such data can also be preferably used to determine when the devices or systems should be removed and/or replaced.

While particular forms of the invention have been described, it will be apparent that various modifications can be made without departing from the spirit and scope of the invention.

What is claimed is:

1. A filtration system for storing and retrieving data from RFID tags, the filtration system comprising:
    a plurality of spiral wound membrane filtration devices, the filtration devices each having at least one membrane sheet wound about a central porous tube;
    at least one RFID tag connected to a component of the filtration system, the at least one RFID tag configured to identify the location of and at least one performance characteristic of one of said filtration devices;
    a computer, the computer in communication with the at least one RFID tag, the computer configured to store and display the location information and performance characteristics related to each of the plurality of filtration devices;
    wherein the computer is configured to assign positions of the plurality of filtration devices within the filtration system relative to each other based on their location information and performance characteristics in order to achieve a minimal performance standard for the filtration system; and
    wherein the filtration devices that are assigned a location in the filtration system meet at least one minimum performance characteristic stored in said computer.

2. The filtration system of claim 1, wherein the component comprises the filtration device.

3. The filtration system of claim 1, wherein the component comprises a connector which connects one filtration device to another in the filtration system.

4. The filtration system of claim 1, wherein the component comprises a permeate exit port located in the filtration system.

5. The filtration system of claim 1, wherein the component comprises a concentrate exit port located in the filtration system.

6. The filtration system of claim 1, wherein the component comprises an entry port located in the filtration system.

7. The filtration system of claim 1, wherein the component comprises a permeate tube located in the filtration system.

8. The filtration system of claim 1, wherein the at least one RFID tag is enclosed within a fluid and/or gas-impermeable container connected to a component of the filtration system.

9. The filtration system of claim 1, wherein the minimum performance characteristic comprises eliminating at least 95% of salt from feed fluid.

10. The filtration system of claim 9, wherein the minimum performance characteristic comprises eliminating at least 99% of salt from feed fluid.

11. The filtration system of claim 10, wherein the minimum performance characteristic comprises eliminating at least 99.6% of salt from feed fluid.

12. The filtration system of claim 1, wherein the minimum performance characteristic comprises filtering at least 5000 gallons of feed per day at 800 psi.

13. The filtration system of claim 12, wherein the minimum performance characteristic comprises filtering at least 6000 gallons of feed per day at 800 psi.

14. The filtration system of claim 1, wherein the minimum performance characteristic comprises a combination of eliminating at least 95% of salt from feed fluid and having a permeate permeability of 0.05 to 0.5 gallons per square foot per day, psi.

15. The filtration system of claim 1, wherein software within the computer is configured to store the location information and performance characteristics.

16. The filtration system of claim 1, wherein software within the computer is configured to assign the positions of the filtration devices relative to each other based on their performance characteristics.

17. The filtration system of claim 1, wherein the information about location and performance characteristics can be periodically added to or removed from the at least one RFID tag.

18. The filtration system of claim 1, wherein the at least one RFID tag is configured to be periodically scanned to monitor the filtration system.

19. A method of monitoring and loading a plurality of filtration devices in accordance with the filtration system of claim 1 comprising:
   a) inputting data indicative of the location and performance characteristics of each filtration device into each device's RFID tag;
   b) periodically monitoring the plurality of filtration devices and inputting updated data into each device's RFID tag;
   c) storing and displaying the location information and performance characteristics data on the computer;
   d) assigning the positions of the plurality of filtration devices relative to each other based on their location information and performance characteristics; and
   e) removing or replacing a filtration device if and when the filtration device fails to meet the at least one minimum performance characteristic.

20. The method of claim 19, wherein the minimum performance characteristic comprises eliminating at least 95% of salt from feed fluid.

21. The method of claim 20, wherein the minimum performance characteristic comprises eliminating at least 99% of salt from feed fluid.

22. The method of claim 21, wherein the minimum performance characteristic comprises eliminating at least 99.6% of salt from feed fluid.

23. The method of claim 19, wherein the minimum performance characteristic comprises filtering at least 5000 gallons of feed per day at 800 psi.

24. The of claim 23, wherein the minimum performance characteristic comprises filtering at least 6000 gallons of feed per day at 800 psi.

25. The method of claim 19, wherein the minimum performance characteristic comprises a combination of eliminating at least 95% of salt from feed fluid and having a permeate permeability of 0.05 to 0.5 gallons per square foot per day, psi.

26. The method of claim 19, wherein the computer stores the location information and performance characteristics.

27. The method of claim 19, wherein the computer assigns the positions of the filtration devices relative to each other based on their performance characteristics.

28. The method of claim 19, further comprising periodically adding to or removing from the at least one RFID tag information about location and performance characteristics.

29. The method of claim 19, further comprising periodically scanning the at least one RFID tag to monitor the filtration system.

* * * * *